United States Patent
Chamberlin et al.

(10) Patent No.: US 6,965,730 B2
(45) Date of Patent: Nov. 15, 2005

(54) METHOD FOR IMPROVING BANDWIDTH EFFICIENCY

(75) Inventors: David Chamberlin, Mountain View, CA (US); David C. Platt, Mountain View, CA (US); Eric Vannier, Fremont, CA (US); Dan Zenchelsky, Los Gatos, CA (US)

(73) Assignee: TiVo, Inc., Alviso, CA (US)

( * ) Notice: Subject to any disclaimer, the term of this patent is extended or adjusted under 35 U.S.C. 154(b) by 212 days.

(21) Appl. No.: 10/275,927

(22) PCT Filed: May 10, 2001

(86) PCT No.: PCT/US01/15323

§ 371 (c)(1), (2), (4) Date: May 22, 2003

(87) PCT Pub. No.: WO01/89203

PCT Pub. Date: Nov. 22, 2001

(65) Prior Publication Data

US 2004/0223722 A1 Nov. 11, 2004

Related U.S. Application Data

(60) Provisional application No. 60/203,804, filed on May 12, 2000.

(51) Int. Cl.[7] .............................. H04N 5/85; H04N 5/97
(52) U.S. Cl. ........................ 386/125; 386/124; 386/46
(58) Field of Search .............................. 386/125, 124, 386/126, 129, 105, 106, 109, 111, 112, 45, 386/40, 46, 68, 70, 69, 81, 82, 1, 6, 27, 33

(56) References Cited

U.S. PATENT DOCUMENTS

| | | | | |
|---|---|---|---|---|
| 4,963,991 A | * | 10/1990 | Honjo | 386/27 |
| 5,822,493 A | * | 10/1998 | Uehara et al. | 386/109 |

FOREIGN PATENT DOCUMENTS

| | | | |
|---|---|---|---|
| EP | 0289914 | * | 11/1988 |
| EP | P.N. 0618695 A2 | * | 5/1994 |
| EP | 0762300 A2 | * | 3/1997 |
| EP | 0780758 | * | 6/1997 |
| EP | 0785675 | * | 7/1997 |
| EP | 0940983 | * | 9/1999 |
| JP | 11120698 | * | 4/1999 |
| WO | WO 99/22513 | * | 5/1999 |
| WO | WO 99/33265 | * | 7/1999 |

* cited by examiner

Primary Examiner—Robert Chevalier
(74) Attorney, Agent, or Firm—Hickman Palermo Truong & Becker, LLP

(57) ABSTRACT

A method for dynamically managing a digital recording system's bandwidth requirements, provides prioritized accesses to the recording system's hard drive according to a pre-defined policy which gives the first priority to the data streams being written to the disk, the second priority to the data streams being read from the disk, and the third priority to other accesses to the disk. The recording system's bandwidth efficiency may also be improved by optimizing allocation of the disk's storage space which is partitioned into lower bandwidth portions and higher bandwidth portions, where lower bandwidth data streams are stored in lower bandwidth portions and higher bandwidth data streams are stored in higher bandwidth portions.

48 Claims, 2 Drawing Sheets

100

METHOD FOR IMPROVING BANDWIDTH EFFICIENCY

This application claims the benefit of Provisional Application No. 60/203,804, filed May 12, 2000.

TECHNICAL FIELD

The invention generally relates to a digital video recording system, and more particularly to a method for bandwidth management in a digital video recorder.

BACKGROUND OF THE INVENTION

Existing digital video recorder (DVR) systems can only process two digital-video data streams at once. Typically, such systems handle "one in, one out", that is, one data stream coming into the system from a digital tuner, or from an analog tuner with an MPEG encoder, and being written to disk, and one data stream going out of the system, which is being read from a hard drive (HD) disk, fed through an MPEG decoder and NTSC encoder, and displayed on a TV set.

Due to the presence of multiple analog or digital tuners, multiple TV-set display capability, and streaming-media downloading via the Internet, new generation DVRs are required to handle multiple digital data streams simultaneously. Some of these digital data streams are time-critical. For example, a digital data stream coming into a recording system must be recorded accurately to a disk without loss or corruption. Otherwise, a permanent glitch will appear any time the recorded program is replayed. Similarly, a digital data stream being read from the disk and decoded for display on a TV must be delivered in a timely manner. Otherwise, the MPEG decoder will starve and a visible glitch will appear on the screen.

The amount of data flowing through a single digital data stream may vary widely. Limited-quality video may require only 1–2 megabits per second, while high-quality video full of rapid motion may require between 10 and 15 megabits per second. New generation television systems may deliver data streams of 19 megabits per second or more. Moving this much data to and from a hard drive is a challenge.

Inexpensive high-value IDE HD disks today are capable of sustained data transfer rates of anywhere from 6 to 18 megabytes per second. Transfer rates vary according to the disk model, and also to the location on the disk to which the data is being transferred.

An HD disk's outer tracks have a higher linear data density (more sectors per track) than the inner tracks. Because an HD disk rotates at a constant rate, the outer tracks can thus accept and deliver more data per second than the inner tracks. A typical HD disk may transfer data at a rate of 10 megabyte per second on the inner tracks, and a rate up to 18 megabytes per second on the outer tracks.

Transfer rates show only one aspect of the disk's performance. They do not reflect the disk's need to seek between different areas of the disk. An operation typically requires 10–25 milliseconds per seek, depending on distance. In addition, they do not reflect the drive's occasional need to read a data sector more than once due to errors on the disk or to the effect of impact and vibration.

Finally, a DVR's HD disk is often used for more than simply storing data streams of video content. The disk may also hold a file system or database containing information about upcoming programs, on-screen guide, and program scheduling. It may also hold executable software used by the DVR. There may thus be many different clients requiring access to the disk. Some accesses such as digital video write and read streams are critically time-sensitive. Some others are less sensitive to delay. For example, slowing down access to executable code or to a program-guide database may cause the DVR's user interface to behave in a sluggish fashion, but does not cause errors or failure of the system. Some others are not at all time-critical and can be deferred for a significant amount of time without anyone noticing. For example, a background task looking for shows that might be of interest to a viewer can be deferred.

What is desired is a mechanism that would enable a digital recording system to dynamically mitigate competing bandwidth requirements when multiple data streams are simultaneously handled.

SUMMARY OF THE INVENTION

The invention provides a method for improving a digital recording system's bandwidth efficiency by prioritizing data stream accesses to the system's hard drive according to a pre-defined policy and by allocating the HD disk's space according to the characteristics of the data streams being recorded. A policy module, together with a media data management module, both of which are incorporated in the recording system's master control program, implements the policy. The policy considerations include (1) data streams being written to the HD disk prioritized over data streams being read from the HD disk and (2) data streams being read from the HD disk prioritized over other accesses to the HD disk. The recording system's bandwidth efficiency may be improved by recording lower bandwidth data streams in the lower bandwidth portions and recording higher bandwidth data streams in the higher bandwidth portions of the HD disk. A data stream is recorded from the inner diameter outwards to the outer diameter of the disk. A recorded data stream may be migrated from a higher bandwidth portion to a lower bandwidth portion.

DETAILED DESCRIPTION OF THE INVENTION

Figure 1:
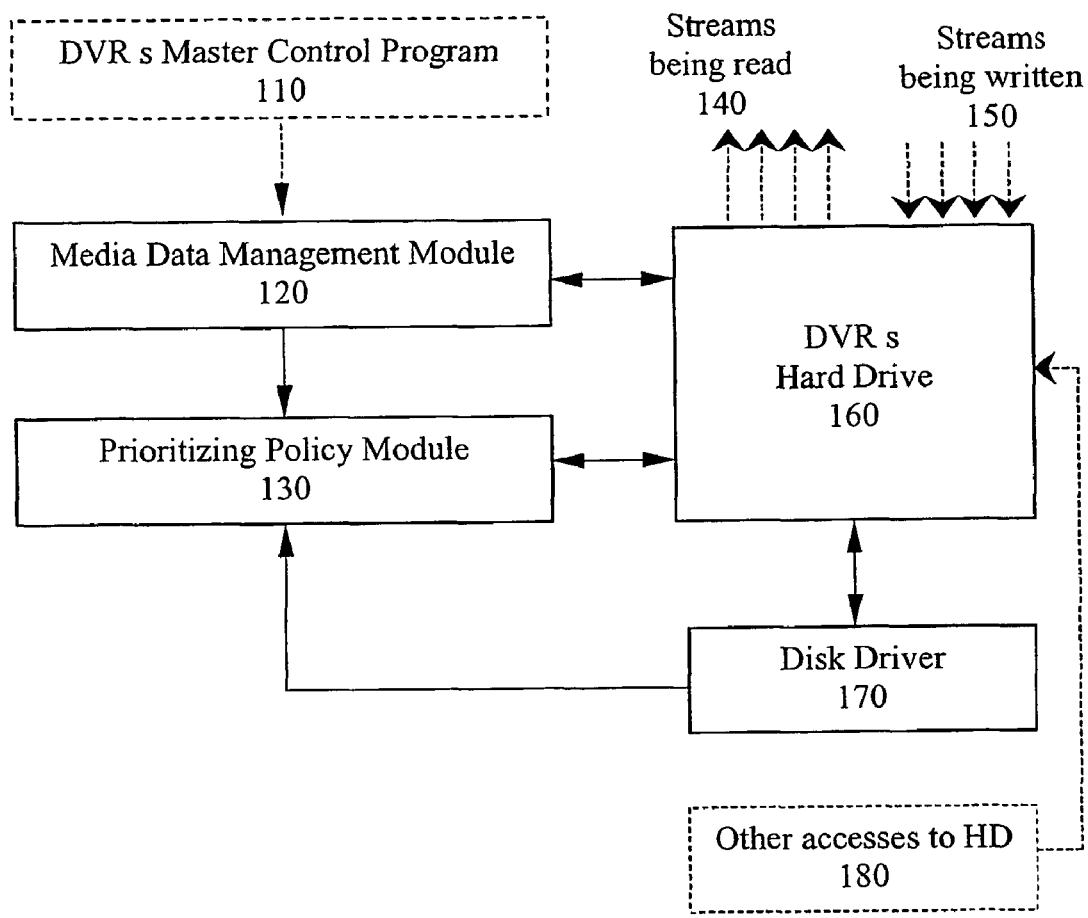
FIG. 1 is a block diagram illustrating processes to determine whether a DVR is running out of bandwidth.

Referring to FIG. 1, illustrated is a system 100 for DVR's bandwidth management, including a hard drive (HD) disk 160 which stores media data streams and other data, a master control program 110 which controls the DVR's internal operations, a media data management module 120 which determines whether the DVR is coming close to failing to meet a time deadline by calculating each data buffer's deadline time, a policy module 130 which implements a prioritizing policy, and a disk driver 170 which determines whether the DVR is coming close to failing to meet a time deadline by measuring the disk's total available time for all on-going data streams' input-output (I/O) requests over a specific time period. The DVR handles multiple output media streams (being read from the hard drive) 140 and multiple input media streams 150 (being written to the hard drive) simultaneously.

In order to balance and manage the competing demands on its HD disk 160, the DVR must define a policy on receiving functions, specific bandwidth, and related conditions. It also needs to have mechanisms in determining disk bandwidth availability, bandwidth allocation, and implementation of the policy.

First policy consideration is the extreme time-sensitivity of the data streams being recorded 150. Losing any portion of a data stream being written to the disk will surely result in a gap in the recording. This gap cannot be repaired after the recording. Therefore, data streams being written to the disk should have the top priority for disk bandwidth.

Second policy consideration is the comparative time-sensitivity of the data streams being read 140 from the hard drive. Failing to read any portion of a data stream from the HD disk in time will surely result in a visible glitch on the screen, or an audible breakup in the audio. It is not so harmful as losing data being written, because a user could always rewind and view the content again and there could be a good chance to retrieve the data properly the second time. Nevertheless, this problem should be avoided.

Third policy consideration is the less time sensitivity of some accesses 180 to the HD disk. It is acceptable if a user interface (UI) slows down when there is a high disk-bandwidth demand as long as it does not become annoyingly slow, or freeze up.

Corresponding to these policy considerations, the deferred, paused, or terminated accesses may be resumed as soon as the bandwidth shortage is mitigated. To optimize bandwidth efficiency, these accesses may be resumed in a pre-defined order that is consistent with the policy considerations. For example, a data stream being written 150 prioritizes over a data stream being read 140, and a data stream being read 140 prioritizes over other accesses 180 such as the tasks that may be performed in the background. In a same category of data streams, a priority order of "nearest deadline first" can be adopted. For example, among several deferred data streams which were being read from the disk before they were deferred, the data stream with a nearest deadline is resumed first.

It is hard to have full control over the bandwidth requirements of the data streams that are being handled. In some cases, e.g. an analog tuner with a MPEG encoder, it is possible to predict the bandwidth requirements in advance quite accurately. In some other cases, e.g. digital data via satellite, the bandwidth requirements are quite unpredictable because they may range from very low up to some well-identified theoretical maximum and may vary through this entire range from one moment to the next.

Very-high-bandwidth data streams are relatively rare. It is possible to design a system with 100% guaranteed operation, i.e. pre-budgeting all streams for the theoretical-worst-case bandwidth. However, that solution would not be able to handle more than two streams in today's conditions on hard drives and streams. Further, that solution would not be cost effective.

By implementing a proper bandwidth policy, a digital recording system may work well with multiple data streams having a high, but less than maximum average bandwidth, and fall back gracefully if the actual bandwidth required exceeds what can be delivered. If the amount of bandwidth required by the data streams being handled exceeds the total available amount, the system should react promptly and automatically to prevent permanent loss of data being recorded.

In the short term, the system may free up disk bandwidth by stopping one or more of the data streams being read from the disk. In practice, this means deferring, pausing, or terminating the video stream being played, and putting up a static display on the screen informing the user that the system's bandwidth capacity has been exceeded.

In the longer term, the system may give the user a choice of several ways to react to the overload. In responding to the overload problems, the user may want to do any of the following: (1) Wait a minute or so, with the video paused, and then try to resume the playback. If the cause of the interruption was a brief burst of high-bandwidth video being recorded, it is possible that there may now be enough disk bandwidth to handle all of the streams; (2) Cancel one or more of the streams being recorded; (3) Jump to live. If the user was watching one of the video streams being recorded, but was viewing the stream in a delayed mode, the user can choose to skip over the remaining delayed portion of the program, and begin watching the program stream in real time. Watching in real time does not require that the stream be read back from the disk. Rather, it can be viewed at the same time it is being written to the disk. This effectively reduces the number of streams competing for disk access; (4) Stop watching the current program, and instead watch one which was recorded at an earlier time and which has a lower stream bandwidth and thus places less of a demand on the disk. There may be other choices available to the user at some point. The system design shall be flexible enough to permit new actions to be added.

Due to the dynamic nature of the data streams a DVR must handle, a static prediction of stream bandwidth is not useful. It is difficult to tell very far in advance whether or not the disk bandwidth is about to run out. This uncertainty is made worse by the extreme difficulty of predicting, with any real accuracy, the exact locations on the disk where a data stream may be stored. Thus it is extremely hard to know how rapidly the data is transferred to and from the disk itself. Furthermore, it is extremely hard to predict disk-related performance problems, such as read or write retries, disk defects, vibration and impact, and the like.

Therefore, a dynamic stream bandwidth management must be adopted. Such management would be able to detect the fact that the system is just about to exceed the HD disk's available bandwidth. It would also have the system respond quickly enough to avoid losing data that is being written to the disk. In effect, this management is based on a negative-feedback mechanism.

The information about actual disk-bandwidth usage can be gathered and fed to one or more modules so as to implement the policy described above. These modules may be included in a DVR's internal code. Streams being received and written to DVR's disk or played back after being read back from the disk pass through the media data management module 120, i.e. the Media Object Model (MOM) software module. This module is responsible for buffer management and for caring and feeding the devices which deliver and consume the data. MOM has substantial knowledge about the internal format of the data streams such as PES triples and is also aware of the states of various buffers used to hold and manage the data. MOM contains code to estimate the deadline time for each buffer of data transferred to or from the disk. In other words, MOM knows the time at which a buffer of data needs to have been written to disk so that the buffer can be re-used to hold new data arriving from the input source, or to have been read from disk so that the data can be fed to the MPEG decoder quickly enough to avoid a visible or audible glitch.

MOM can be enhanced to report this information to the policy module 130 which implements the policy. In particular, if MOM determines that it has difficulty in reading or writing data in time to meet its deadlines, or in other words if it looks as if the system is coming close to failing to meet MOM's deadlines, it can send a warning event to the policy module 130 to report the fact. If a deadline actually is missed, and if MOM determines that data has been lost or that a visible glitch has occurred, MOM sends an urgent error alert to the policy module 130 to report the fact.

The disk driver 170, which may be the kernel's disk driver, has detailed knowledge about the current state of each hard drive. A current implementation accepts deadline timing information along with each media data stream I/O request. It optimizes the order of accesses to the disk, in order to (1) guarantee that each deadlined I/O request is completed in advance of its deadline and (2) minimize the total amount of seek time required to perform the I/O requests. If the disk driver 170 determines that it may be unable to satisfy the deadline requirements on all of its I/O requests, it reverts to an "emergency mode" and performs all deadlined requests in a "nearest deadline first" order.

To deal with bandwidth and deadline problems more effectively, the disk driver 170 can be enhanced in at least two ways. First, it can measure the total amount of disk bandwidth being used for media data stream I/O requests that have deadlines. Rather than trying to measure this bandwidth in megabytes per second, it measures a percentage of the drive's total available time over a relatively short period such as ½ second or so. If the total media data stream I/O time is about to exceed a programmable threshold (e.g. 90%) for more than a specific amount of time (e.g. 1 second), the disk driver 170 will send a warning signal to the policy module 130.

Second, the disk driver 170 can implement a different internal policy in cases where deadline violations appear to be inevitable. Rather than switching to a strict "earliest deadline first" policy, it may implement a "writes are more important than reads" policy. It may schedule any pending media write requests first in order to avoid loss of data. It may treat pending media read requests in either of two ways—"best efforts", i.e., schedule them after the writes have been completed and hope that they meet their deadlines anyhow, or "early failure", i.e., cancel the requests as soon as a deadline violation appears inevitable so that MOM has more warning of the problem and can alert the policy module itself.

The policy module 130 is in charge of making decisions about when it is necessary to stop playback of a data stream and offer the user a choice of alternative actions. The policy module can be also used in other ways to reduce the total I/O load on the recording system before bandwidth is run out.

In particular, during the lasting period of a high media data stream I/O load, the policy module can decide to defer some of the system's background tasks which use an appreciable amount of disk I/O bandwidth. There are a number of obvious candidates for this sort of deferral. For example: the system's garbage collector and index-builder can be held off or cancelled if they are already in progress; the daily "Phone the service provider to download updated showcases and/or program guide data" call can be deferred; and the suggestion prioritizer can be held off or cancelled if it is already running. This kind of control can be performed by the existing background-task supervisor in the Master Control Program (MCP) 110 upon adopting a proper policy interface.

Figure 2:
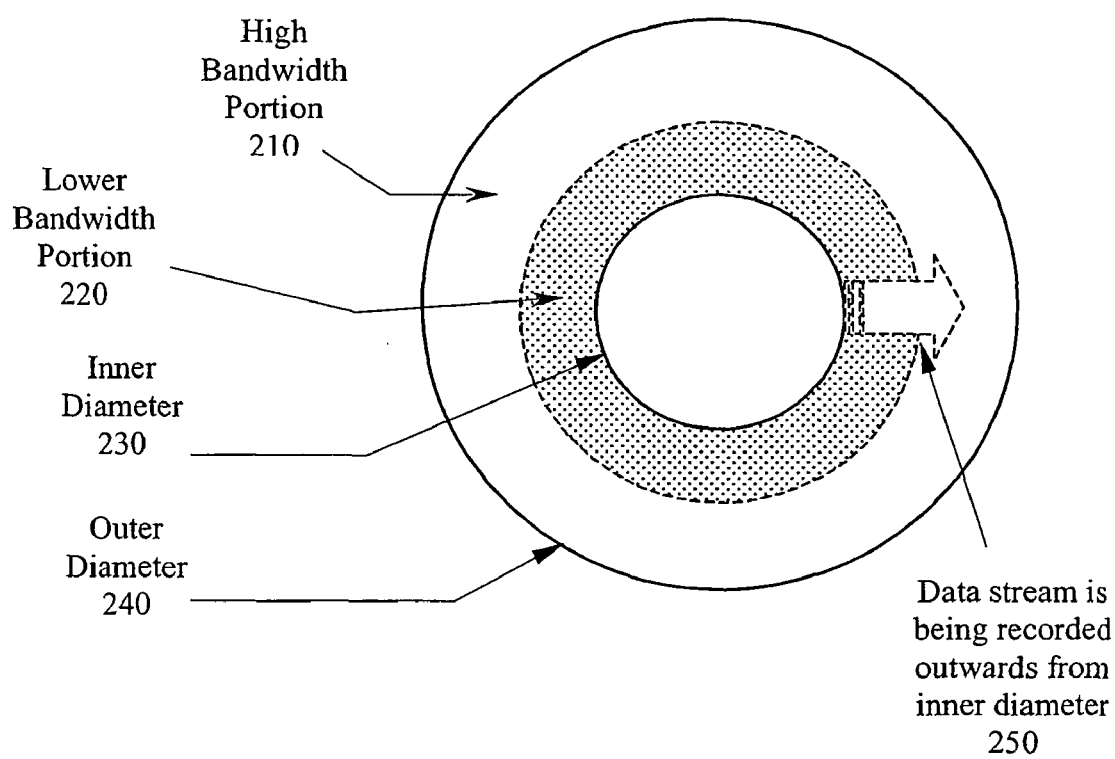
FIG. 2 is an exemplary graphical diagram showing a media stream is being recorded to the VCR's HD disk from the lower bandwidth portion (i.e. inner diameter) outwards to the high bandwidth portion (i.e. the outer diameter).

Referring to FIG. 2, illustrated is an exemplary graphic diagram for a typical round disk which is partitioned into a lower bandwidth portion 220 and a higher bandwidth portion 210. The disk's ability to transfer data rapidly depends to a significant degree upon which portion of the disk is used. The inner portions of each platter have fewer sectors per track than the outer portions, and thus require more time to transfer any given amount of data. Therefore, the recording system's ability to transfer high-bandwidth streams effectively can be improved if it is possible to guarantee that the high-bandwidth streams are written primarily in the outer portions of the platter.

It is not always possible to know in advance how high the bandwidth of a given data stream will actually be. In other words, the data about the bandwidth of a given data stream is sometimes unavailable. In many cases, however, an "after the fact" approach may be adopted to improve the system's bandwidth efficiency.

This approach includes the following steps:

1. Divide the disk's media storage into a set of partitions to be used for different purposes. For example, the storage is divided into two media partitions: lower bandwidth portion 220 and higher bandwidth portion 210. The lower bandwidth portion 220 stores lower bandwidth streams, starting from the inner diameter (ID) 230; and the higher bandwidth portion 210 stores the higher bandwidth streams, ending at the outer diameter (OD) 240. It is also needed to flag a given partition as being higher or lower bandwidth. This may be done via one of the spare bits in the partition table of a database. The bandwidth flag will be migrated into a media file system (MFS)'s region data structures when the file system is initialized.

In one embodiment, a disk dedicates two partitions for the MFS. Within each partition, the MFS stores one or more regions for purposes that are specific to the way that the MFS handles things. In one partition, the MFS stores the "nodes" (i.e. the basic description of each file or directory) and the contents of the data files—this makes up two regions. In the other partition, the MFS stores a single region which holds the video recordings. Associated with each region is a set of data structures, which are stored on disk (in the beginning of the region area, usually) and are loaded into memory when the system is booted. These data structures tell the MFS software how big the region is (i.e. how many data sectors are in it), the size of the region's allocation block size (e.g. the number of sectors it allocates each time space is requested), and a set of "bitmaps" which identify the allocation blocks that are free (available) or in use (assigned to a file or recording). The bandwidth flag is a one-bit flag which says "This region is in the slower portion of the disk." The flag is added to the in-memory region data structure.

2. Extend the MFS space-allocation API to accept an additional parameter, indicating whether the data stream is known to be of low bandwidth. If the low-bandwidth flag is set, space will be allocated preferentially from any available low-bandwidth partition 250, i.e. from the inner diameter outwards to the outer diameter. If the low-bandwidth flag is not set, space will be allocated preferentially from high-bandwidth partitions, i.e. from the outer diameter inwards to the inner diameter. In either case, space will be allocated for the data stream if it is available in any partition because the system will not guarantee that an entire data stream will fall in either type of partition.

3. Request low-bandwidth allocation when a stream of known low bandwidth is being recorded to the disk. This may be done via MyWorld, or ele2pestriple or whatever is creating an MFS stream file, which sets a low-bandwidth flag. An MFS stream file is a way of storing MPEG-2 audio and video data in a file on disk. Each stream file consists of a series of "records". A record consists of a fairly large number of disk data sectors (typically 256 sectors per record, or 128 k bytes). Each record has some header information in its first sector which identifies the location, type, and size of each piece of audio or video data stored in the record. The MFS stream file is always written sequentially, for example, from the first record to the last. During normal playback it is read sequentially. It may be read randomly, for example, skipping around forwards or backwards during fast-forward and rewind operations.

4. When a data stream of unknown bandwidth is being recorded to the disk, MyWorld, or the like, will not set a low-bandwidth flag. Consequently, the data stream is recorded on a high-bandwidth portion of the hard drive.

5. Monitor the actual average or peak bandwidth required by the data stream during the recording process. This may be performed by the software for writing the data stream to the hard drive in terms of actual data-arrival rate from the input medium or network, but would probably be better performed by tracking the timestamps embedded in the data stream itself.

6. If, after a data stream of unknown bandwidth has been completely recorded, the recording software may check and determine whether the recording's peak or average bandwidth is lower than a pre-defined value. If yes, the recording software may choose to migrate the data stream to a lower-bandwidth portion of the disk. This can be done by creating a new file for the data stream in a low-bandwidth portion, playing the contents of the data stream, and recording it into the new file. As soon as the contents of the data stream have been copied into the new file, the original file for the data stream is deleted. This process can be performed in the background, with no deadline times on the read and write requests. Therefore, it may use any otherwise-unused disk bandwidth and does not interfere significantly with deadlined I/O requests for other data streams being recorded or played.

This approach tends to result in the high-bandwidth, "greedy" data streams being located in those portions of the disk best able to deliver the data rapidly during playback. The average and/or peak bandwidth information for each recording may be stored in the system's database. This might enable the system to give a user an early warning if the user tries to play back a high-bandwidth recording when the real-time bandwidth demands are already excessive.

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

What is claimed is:

1. A method for dynamically managing bandwidth requirements for a digital recording system which stores data streams in a storage device, comprising:

detecting a situation prior to said digital recording system exceeding said storage device's available bandwidth;

prioritizing accesses to said storage device according to a policy to avoid losing data from a data stream that is being written to or being read from said storage device; and wherein said step of detecting a situation comprises the sub-steps of:

determining, by a media data management module, whether said digital recording system is close to failing to meet a time deadline for writing a data stream to said storage device or reading a data stream from said storage device; and wherein if said digital recording system is close to failing to meet a time deadline for writing a data stream to said storage device or reading a data stream from said storage device, then reporting this fact to a policy module which implements said policy;

wherein said media data management module measures said time deadline for each buffer of data transferred to or from said storage device.

2. The method of claim 1, further comprising the sub-step of:

sending an urgent error alert to said policy module if a time deadline is missed.

3. A method for dynamically managing bandwidth requirements for a digital recording system which stores data streams in a storage device, comprising:

detecting a situation prior to said digital recording system exceeding said storage device's available bandwidth;

prioritizing accesses to said storage device according to a policy to avoid losing data from a data stream that is being written to or being read from said storage device; and wherein said step of detecting a situation comprises the sub-steps of:

determining, by a disk driver, whether said digital recording system is close to failing to meet deadline requirements on all on-going data streams' input-output requests; and wherein if said digital recording system is close to failing to meet deadline requirements on all on-going data streams' input-output requests, then reporting this fact to said policy module which implements said policy.

4. The method of claim 3, wherein said disk driver measures its total available time for all on-going data streams' input-output requests over a specific time period; and wherein if said total available time exceeds a programmable threshold for more than said specific time period, then said driver determines that said digital recording system is coming close to failing to satisfy deadline requirements on all on-going data streams' input-output requests.

5. The method of claim 3, wherein said disk driver is a kernel's disk driver.

6. A method for dynamically managing bandwidth requirements for a digital recording system which stores data streams in a storage device, comprising:

detecting a situation prior to said digital recording system exceeding said storage device's available bandwidth;

prioritizing accesses to said storage device according to a policy to avoid losing data from a data stream that is being written to or being read from said storage device; and wherein said step of prioritizing comprises a sub-step of:

deferring, pausing, or terminating one or more accesses to said storage device in a priority order of:

accesses other than data streams that are being written or read;

data streams that are being read from said storage device; and data streams that are being written to said storage device.

7. The method of claim 6, further comprising the sub-step of:

when said digital recording system's bandwidth requirements are mitigated, resuming said deferred, paused, or terminated accesses in a priority order of:
data streams that were being written to said storage device before they were deferred, paused, or terminated;
data streams that were being read from said storage device before they were deferred, paused, or terminated; and
accesses other than data streams that were being written or read before they were deferred, paused or terminated.

8. The method of claim 7, said data streams that were being written to said storage device before they were deferred, paused, or terminated are resumed in a nearest deadline first order.

9. The method of claim 7, wherein said data streams that were being read from said storage device before they were deferred, paused, or terminated are resumed in a nearest deadline first order.

10. A method for improving bandwidth efficiency of a digital recording system which stores data streams in a storage device, said method comprising the steps of:
partitioning said storage device's space into a set of portions, some of which are used for storing lower bandwidth data streams and some of which are used for storing higher bandwidth data streams;
indicating whether a data stream is known to be of low bandwidth;
requesting low-bandwidth allocation when a data stream known to be of low bandwidth is being recorded; and
monitoring an actual average or peak bandwidth required by said data stream being recorded;
wherein each portion is associated with a set of data structures which are stored on said storage device and are loaded into memory when a media file system is initialized.

11. The method of claim 10, wherein the step of indicating whether a data stream is known to be of low bandwidth is performed by a parameter which is included in a space-allocation API of said media file system.

12. The method of claim 10, further comprising the step of:
flagging, by a flag, a given disk region as a lower bandwidth portion or a higher bandwidth portion.

13. The method of claim 12, wherein said flag is incorporated into a data structure associated with each specific portion of said storage device.

14. The method of claim 12, wherein said flag is a one-bit flag which shows that a specific area is in a lower bandwidth portion of said storage device.

15. The method of claim 10, further comprising the step of:
allocating space preferentially from any available low-bandwidth portion if said data stream is of low bandwidth.

16. The method of claim 15, wherein space is allocated outwards from the inner diameter of said storage device.

17. The method of claim 10, further comprising the step of:
allocating space preferentially from any available high-bandwidth portion if said data stream is not of low bandwidth.

18. The method of claim 17, wherein space is allocated inwards from the outer diameter of said storage device.

19. The method of claim 10, wherein said step of monitoring an actual or peak bandwidth is performed in terms of actual-arrival rate from an input medium or a network.

20. The method of claim 10, wherein said step of monitoring an actual or peak bandwidth is performed by tracking timestamps which are embedded in said data stream.

21. The method of claim 10, further comprising the steps of:
checking a recorded unknown bandwidth data stream in a higher bandwidth portion to determine whether its peak or average bandwidth is lower than a pre-defined value; and
migrating said data stream to a lower bandwidth portion if said recorded unknown bandwidth data stream's peak or average bandwidth is lower than a pre-defined value.

22. The method of claim 21, wherein said step of migrating comprises the sub-steps of:
creating a new file in said low-bandwidth portion for said data stream;
playing contents of said data stream and recording said contents into said new file; and
deleting the original file for said data stream once said contents are recorded into said new file.

23. The method of claim 21, wherein said step of migrating is performed in the background with no time deadlines on read and write requests.

24. The method of claim 10, further comprising the step of:
caching average or peak bandwidth information for each recording in a database.

25. An apparatus for dynamically managing bandwidth requirements for a digital recording system which stores data streams in a storage device, comprising:
a module for detecting a situation prior to said digital recording system exceeding said storage device's available bandwidth;
a module for prioritizing accesses to said storage device according to a policy to avoid losing data from a data stream that is being written to or being read from said storage device; and
wherein said module of detecting a situation comprises:
a media data management module that determines whether said digital recording system is close to failing to meet a time deadline for writing a data stream to said storage device or reading a data stream from said storage device; and
wherein if said digital recording system is close to failing to meet a time deadline for writing a data stream to said storage device or reading a data stream from said storage device then reporting this fact to a policy module which implements said policy;
wherein said media data management module measures said time deadline for each buffer of data transferred to or from said storage device.

26. The apparatus of claim 25, further comprising:
a module for sending an urgent error alert to said policy module if a time deadline is missed.

27. An apparatus for dynamically managing bandwidth requirements for a digital recording system which stores data streams in a storage device, comprising:
a module for detecting a situation prior to said digital recording system exceeding said storage device's available bandwidth;
a module for prioritizing accesses to said storage device according to a policy to avoid losing data from a data stream that is being written to or being read from said storage device; and wherein said detecting module comprises:
  a disk driver that determines whether said digital recording system is close to failing to meet deadline requirements on all on-going data streams' input-output requests; and
  wherein if said digital recording system is close to failing to meet deadline requirements on all on-going data streams' input-output requests then reporting this fact to said policy module which implements said policy.

28. The apparatus of claim 27, wherein said disk driver measures its total available time for all on-going data streams' input-output requests over a specific time period; and
  wherein if said total available time exceeds a programmable threshold for more than said specific time period, then said driver determines that said digital recording system is coming close to failing to satisfy deadline requirements on all on-going data streams' input-output requests.

29. The apparatus of claim 27, wherein said disk driver is a kernel's disk driver.

30. A apparatus for dynamically managing bandwidth requirements for a digital recording system which stores data streams in a storage device, comprising:
  a module for detecting a situation prior to said digital recording system exceeding said storage device's available bandwidth;
  a module for prioritizing accesses to said storage device according to a policy to avoid losing data from a data stream that is being written to or being read from said storage device; and
  wherein said prioritizing module comprises:
    a module for deferring, pausing, or terminating one or more accesses to said storage device in a priority order of:
    accesses other than data streams that are being written or read;
    data streams that are being read from said storage device; and
    data streams that are being written to said storage device.

31. The apparatus of claim 30, further comprising:
  a module for when said digital recording system's bandwidth requirements are mitigated, resuming said deferred, paused, or terminated accesses in a priority order of:
  data streams that were being written to said storage device before they were deferred, paused, or terminated;
  data streams that were being read from said storage device before they were deferred, paused, or terminated; and
  accesses other than data streams that were being written or read before they were deferred, paused or terminated.

32. The apparatus of claim 31, said data streams that were being written to said storage device before they were deferred, paused, or terminated are resumed in a nearest deadline first order.

33. The apparatus of claim 31, wherein said data streams that were being read from said storage device before they were deferred, paused, or terminated are resumed in a nearest deadline first order.

34. An apparatus for improving bandwidth efficiency of a digital recording system which stores data streams in a storage device, said apparatus comprising the steps of:
  a module for partitioning said storage device's space into a set of portions, some of which are used for storing lower bandwidth data streams and some of which are used for storing higher bandwidth data streams;
  a module for indicating whether a data stream is known to be of low bandwidth;
  a module for requesting low-bandwidth allocation when a data stream known to be of low bandwidth is being recorded; and
  a module for monitoring an actual average or peak bandwidth required by said data stream being recorded;
  wherein each portion is associated with a set of data structures which are stored on said storage device and are loaded into memory when a media file system is initialized.

35. The apparatus of claim 34, wherein the step of indicating whether a data stream is known to be of low bandwidth is performed by a parameter which is included in a space-allocation API of said media file system.

36. The apparatus of claim 34, further comprising:
  a module for flagging, by a flag, a given disk region as a lower bandwidth portion or a higher bandwidth portion.

37. The apparatus of claim 36, wherein said flag is incorporated into a data structure associated with each specific portion of said storage device.

38. The apparatus of claim 36, wherein said flag is a one-bit flag which shows that a specific area is in a lower bandwidth portion of said storage device.

39. The apparatus of claim 34, further comprising:
  a module for allocating space preferentially from any available low-bandwidth portion if said data stream is of low bandwidth.

40. The apparatus of claim 39, wherein space is allocated outwards from the inner diameter of said storage device.

41. The apparatus of claim 34, further comprising:
  a module for allocating space preferentially from any available high-bandwidth portion if said data stream is not of low bandwidth.

42. The apparatus of claim 41, wherein space is allocated inwards from the outer diameter of said storage device.

43. The apparatus of claim 34, wherein said monitoring module is performed in terms of actual-arrival rate from an input medium or a network.

44. The apparatus of claim 34, wherein said monitoring module is performed by tracking timestamps which are embedded in said data stream.

45. The apparatus of claim 34, further comprising:
  a module for checking a recorded unknown bandwidth data stream in a higher bandwidth portion to determine whether its peak or average bandwidth is lower than a pre-defined value; and
  a module for migrating said data stream to a lower bandwidth portion if said recorded unknown bandwidth data stream's peak or average bandwidth is lower than a pre-defined value.

46. The apparatus of claim 45, wherein said migrating module comprises:
  a module for creating a new file in said low-bandwidth portion for said data stream;
  a module for playing contents of said data stream and recording said contents into said new file; and
  a module for deleting the original file for said data stream once said contents are recorded into said new file.

47. The apparatus of claim 45, wherein said migrating module is performed in the background with no time deadlines on read and write requests.

48. The apparatus of claim 34, further comprising:
  a module for caching average or peak bandwidth information for each recording in a database.

* * * * *